(12) United States Patent
Kanevsky et al.

(10) Patent No.: US 8,036,415 B2
(45) Date of Patent: Oct. 11, 2011

(54) METHOD AND SYSTEM FOR NANO-ENCODING AND DECODING INFORMATION RELATED TO PRINTED TEXTS AND IMAGES ON PAPER AND OTHER SURFACES

(75) Inventors: Dimitri Kanevsky, Ossining, NY (US); Dmitri V. Talapin, Richmond, CA (US)

(73) Assignee: International Business Machines Corporation, Armonk, NY (US)

( * ) Notice: Subject to any disclaimer, the term of this patent is extended or adjusted under 35 U.S.C. 154(b) by 1150 days.

(21) Appl. No.: 11/619,454

(22) Filed: Jan. 3, 2007

(65) Prior Publication Data

US 2008/0159657 A1    Jul. 3, 2008

(51) Int. Cl.
*G06K 9/00* (2006.01)
*G06K 9/36* (2006.01)
*G06K 19/06* (2006.01)

(52) U.S. Cl. .................... 382/100; 382/232; 235/491
(58) Field of Classification Search .................. 382/100, 382/232; 235/491
See application file for complete search history.

(56) References Cited

U.S. PATENT DOCUMENTS

| | | | | |
|---|---|---|---|---|
| 5,642,442 | A * | 6/1997 | Morton et al. | 382/287 |
| 5,764,807 | A * | 6/1998 | Pearlman et al. | 382/240 |
| 5,883,043 | A | 3/1999 | Halbrook, Jr. et al. | |
| 6,746,508 | B1 | 6/2004 | Deevi et al. | |
| 6,964,374 | B1 * | 11/2005 | Djuknic et al. | 235/462.01 |
| 7,561,289 | B2 * | 7/2009 | Talley et al. | 358/1.15 |
| 2002/0041372 | A1 | 4/2002 | Gardner et al. | |
| 2003/0005304 | A1 | 1/2003 | Lawandy et al. | |
| 2003/0032192 | A1 | 2/2003 | Haubold et al. | |
| 2004/0262400 | A1 | 12/2004 | Chang et al. | |
| 2005/0019556 | A1 | 1/2005 | Freeman et al. | |
| 2005/0032226 | A1 * | 2/2005 | Natan | 436/56 |
| 2005/0068395 | A1 | 3/2005 | Haubold et al. | |
| 2005/0112360 | A1 | 5/2005 | Berger et al. | |

(Continued)

FOREIGN PATENT DOCUMENTS

JP    2000263913    9/2000

OTHER PUBLICATIONS

"Disappearing Act: Xerox Researchers Demonstrate Color Prints with Images that Switch Under Different Colored Lights", Copyright 1999-2005, Printingforless.com and Creativepro.com; Date: May 15, 2003;3 pages.

(Continued)

*Primary Examiner* — Wengpeng Chen
(74) *Attorney, Agent, or Firm* — Cantor Colburn LLP; Ann Dougherty

(57) ABSTRACT

A method and system for nano-encoding and decoding information related to printed texts and images on paper and other surfaces is provided. The system and method includes a nano-encoder for encoding information related to printed texts and images; and then collocating the encoded information with the related printed texts and/or images. The system also includes a nano-decoder for decoding information encoded by the nano-encoder. The nano-decoder includes a text processing database having a translator database. The translator database includes a definition database; and a summary database. In addition, the system and method includes detecting luminescent nano particles and/or magnetic nano particles; and determining invariant properties of the detected nano particles. The invariant properties are then matched with coded information. The system and method includes matching the invariant properties with predetermined coded information and analyzing the invariant properties of the detected nano particles for segmentation.

7 Claims, 6 Drawing Sheets

U.S. PATENT DOCUMENTS

2005/0242035 A1    11/2005  Cobbe et al.
2007/0110322 A1*    5/2007  Yuille et al. .................. 382/227
2007/0119951 A1*    5/2007  Auslander et al. ............ 235/491

OTHER PUBLICATIONS

D.V. Talapin et al.; "CdSe/CdS/ZnS and CdSe/ZnSe/ZnS Core-Shell-Shell Nanocrystals"; J. Phys. Chem. B. 2004; vol. 108; pp. 11826-18831; and Editors' Choice Science 2004; vol. 306; p. 1439.

Dmitri V. Talapin et al.; "Etching of Colloidal InP Nanocrystals with Fluorides: Photochemical Nature of the Process Resulting in High Photoluminescence Efficiency"; Published Nov. 14, 2002; J. Phys. Chem. B.; vol. 106; No. 49; 2002 pp. 12659-12-663.

Dmitri V. Talapin et al.; Highly Luminescent Monodispese CdSe and CdSe/ZnS Nanocrystals Synthesizes in a Hexadecylaminie—Trioctylphosphine Oxide—Trioctylphospine Mixture; Nano Lett; vol. 1, No. 4; 2001; published on the Web Mar. 16, 2001—pp. 207-211.

Risk Reactor, [online]; [retrieved on Jan. 26, 2005]; retrieved from the Internet http://www.riskreactor.com/industries/invisible_marking_pens.htm "Invisible Marking Pens!" 2005; 4 pages, Risk Reactor, Huntington Beach, CA USA.

K. Riwotzki et al.; Liquid-Phase Synthesis of Colloids and Redispersible Powders of Strongly Luminescing LaP04:Ce, Tb Nanocrystals ; Angew. Chem. Int. Ed. 40, pp. 573-576—Year: 2001.

Green Emitting CePO4:Tb/LaP04 Core-Shell Nanoparticles with 70% Photoluminescence Quantum Yield, Angewandte Chemie International Edition vol. 42; Issue 44; 2003; pp. 5513-5516.

Thomas Publishing Company, [online]; [retrieved on Nov. 18, 2005]; retrieved from the Internet; http://news.thomasnet.com/fullstory/24395/264 "M.I.C.R. Compliant Inkjet printers." Jul. 14, 2003 "Revolutionary New Security Technology! For the First time Available: M.I.C.R. Ink for Inkjet Printers" Jul. 8, 2003, 5 pages, Thomas Publishing Company.

St. Herr et al.; High Efficient Emission in Transparent colloids of Lanthanide—Doped NaYF4 Nanocrystals. Published in: Advanced Materials 2004, 16, No. 23-24, Dec. 17.

Sun et al.; Monodisperse FePt Nanoparticles and Ferromagnetic FePt Nanocrystal Superlattices; Science Mar. 17, 2000; pp. 1989-1992.

* cited by examiner

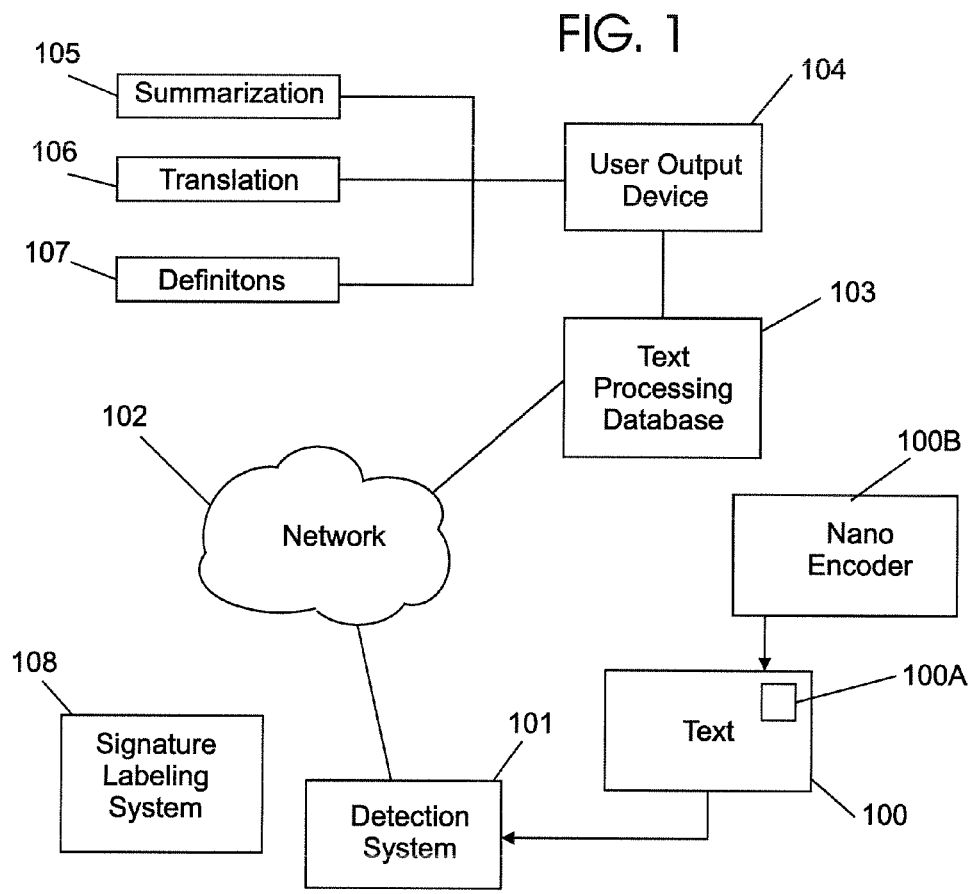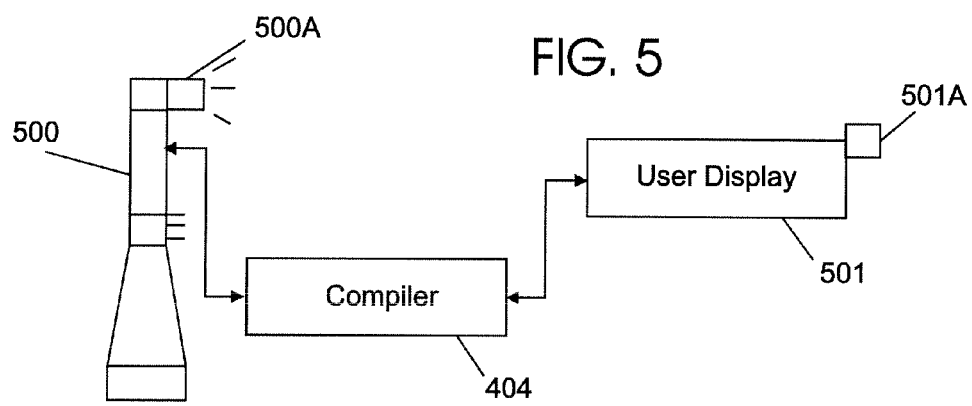

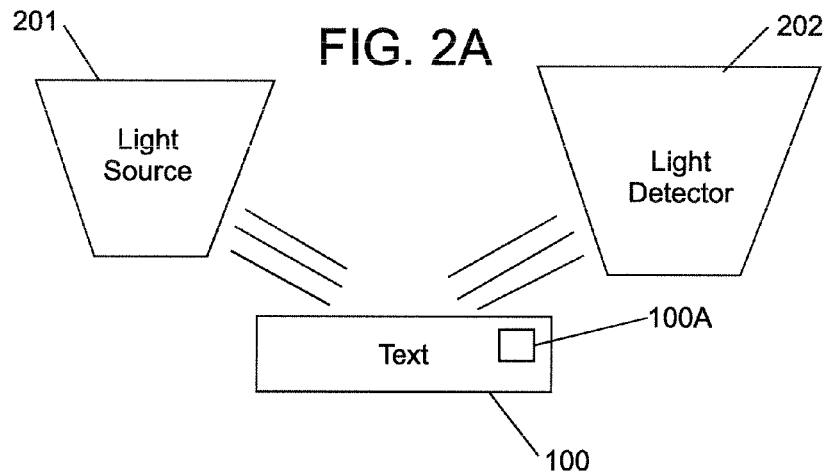
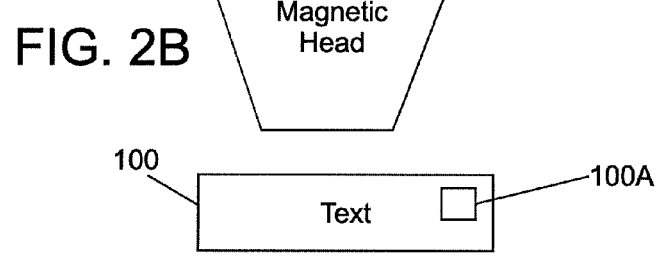
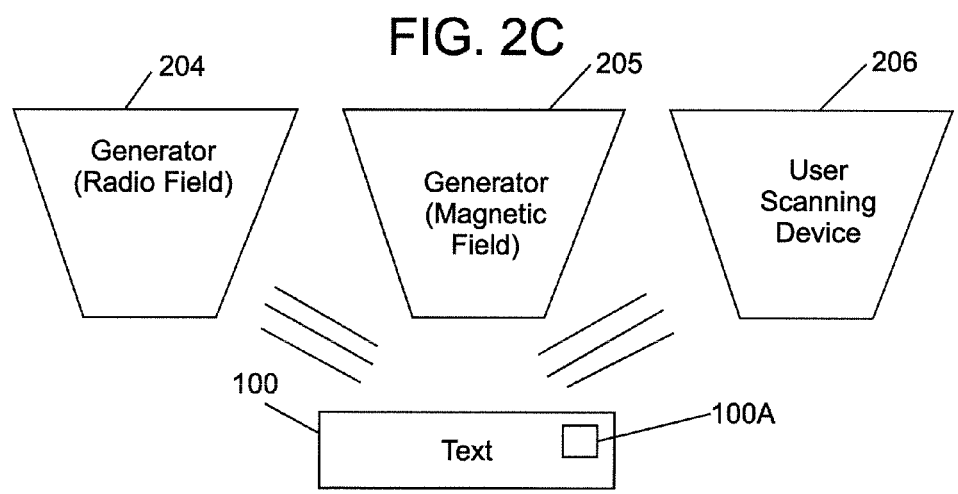

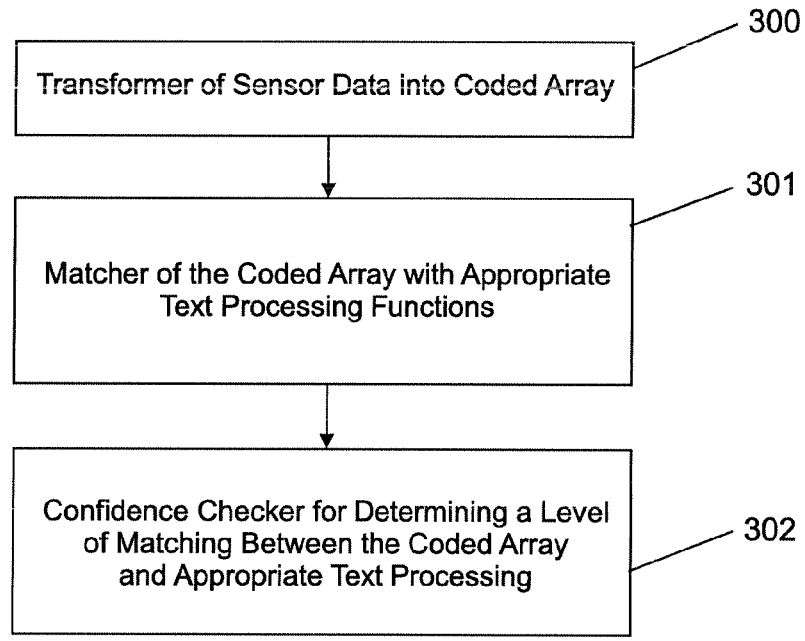
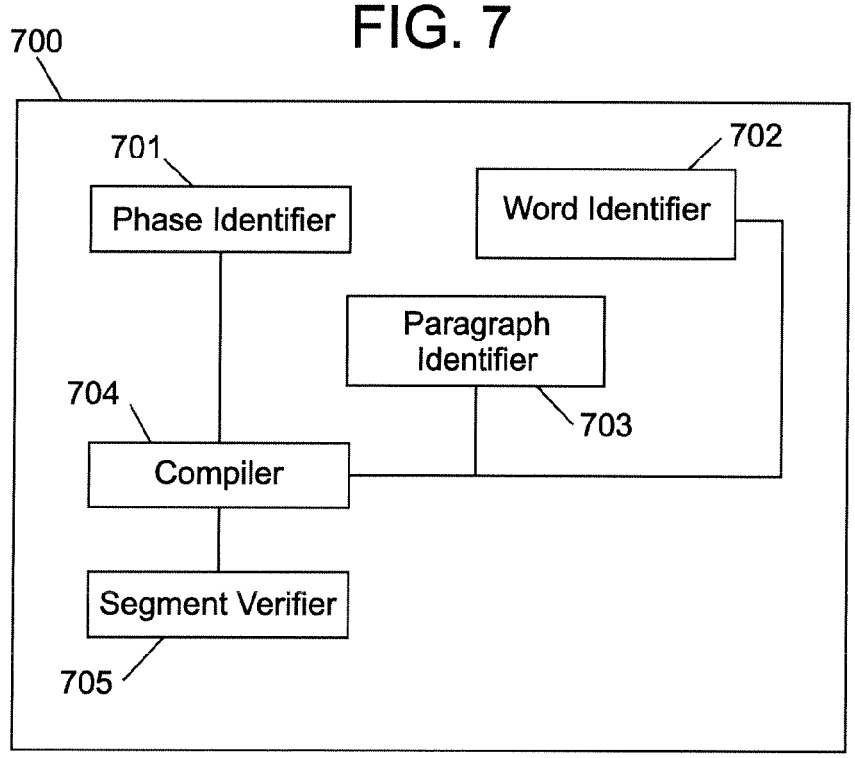

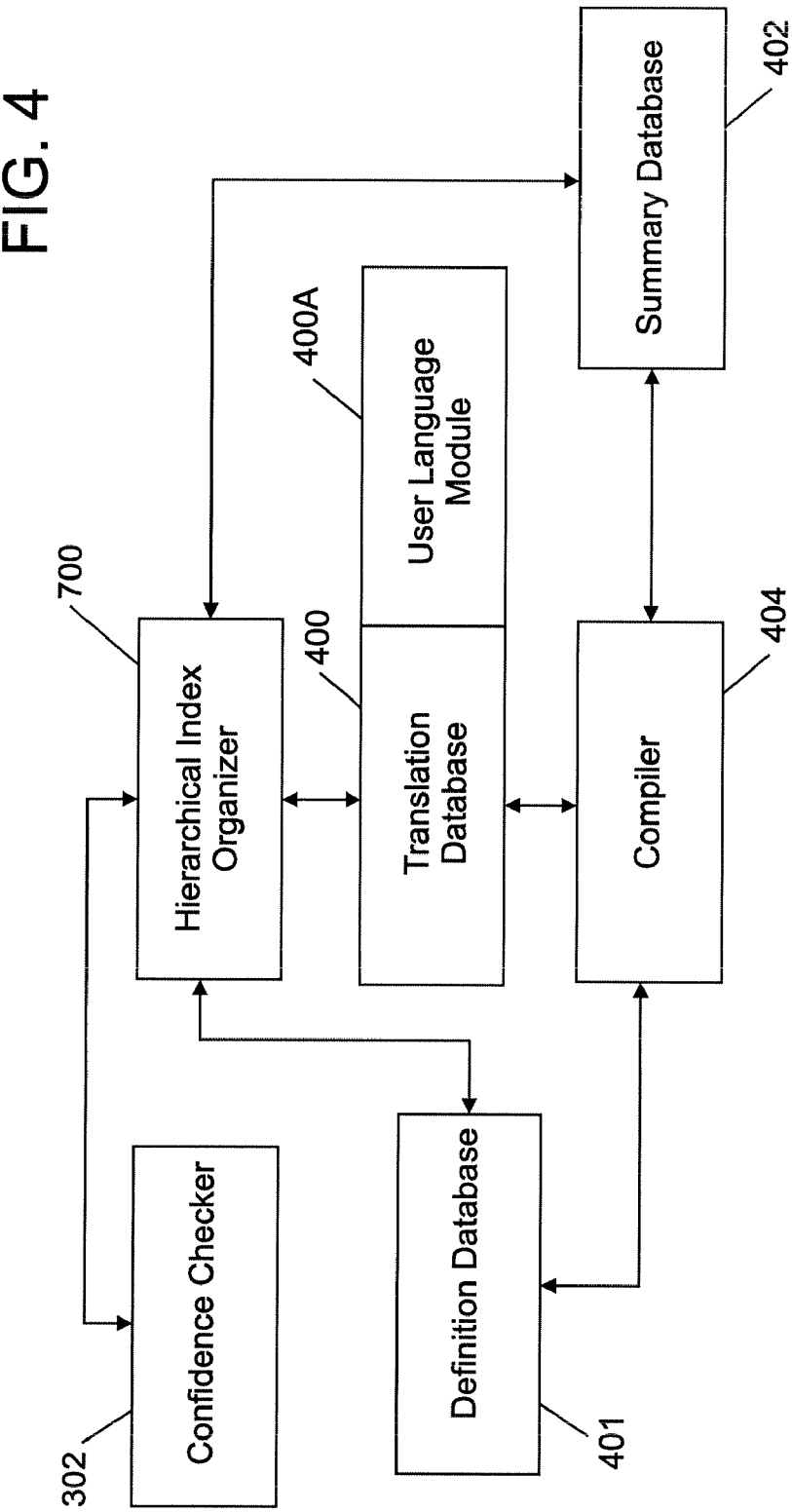

METHOD AND SYSTEM FOR NANO-ENCODING AND DECODING INFORMATION RELATED TO PRINTED TEXTS AND IMAGES ON PAPER AND OTHER SURFACES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to digitizing text, and particularly to nano-encoding and decoding of information related to printed texts and images on paper and other surfaces.

2. Description of the Related Art

Current technologies, such as Optical Character Recognition (OCR) allow for the digitization and subsequent processing of printed text and images. However, OCR is error prone and not very efficient at transcribing a diversity of texts and images. OCR accuracy depends on the quality of the paper (transcription is significantly worse when the quality of the paper is low). Also, high quality OCR requires the scanning to be done directly from the paper containing the text. Remote scanning of a paper with text (for example, via a camera) reduces the OCR quality. OCR is also inefficient at for digitizing and interpretation of images and text on products or other surfaces where text does not lie flat.

Thus, there exists a need to improve OCR and digitizing of text and images. There also exists a need to improve search and other types of text processing like translation, definition, and summarization.

SUMMARY OF THE INVENTION

The shortcomings of the prior art are overcome and additional advantages are provided through the provision of nano-particles inserted into text and images in order to encode various information. Such nano-particles can be embedded in ink or inserted into text and images via a special printing device. The encoding of nano-particles should improve OCR and digitizing of text and images. It can be used to improve search and other types of text processing like translation, definition, and summarization.

In accordance with one embodiment of the present invention a system for nano-encoding and decoding information related to printed texts and images on paper and other surfaces is provided. The system includes a nano-encoder for encoding information related to printed texts and images; and then collocating the encoded information with the related printed texts and/or images. The system also includes a nano-decoder for decoding information encoded by the nano-encoder. The nano-decoder includes a text processing database having a translator database. The translator database includes a definition database; and a summary database.

The invention is also directed towards a method for nano-encoding information related to printed texts or images on paper and other surfaces. The method includes fabricating indicia selected from the group consisting of colloidal chemical synthesis, sonochemical synthesis, inert gas condensation, arc discharge, and/or laser pyrolysis. The method then fabricates composite nano-particles from the fabricated indicia for desired signature information; and collocates the fabricated composite nano-particles with the printed text or images. The method also includes nano-decoding the information, wherein nano-decoding the information includes detecting nano particles and determining invariant properties of the detected nano particles. The invariant properties are then match with predetermined coded information and the user is provided with the decoded information.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

The present invention relates to text recognition as a means of manipulating a printed text using small-scale indicia that can be used to translate, summarize, define any given encoded text.

As a result of the summarized invention, technically we have achieved a solution which tangibly embodies a program of instruction executable by the machine to perform a method for nano-encoding information related to printed texts or images on paper and other surfaces. The method includes fabricating indicia selected from the group consisting of colloidal chemical synthesis, sonochemical synthesis, inert gas condensation, arc discharge, and/or laser pyrolysis. The method also includes fabricating composite nano-particles from the fabricated indicia for desired signature information; and collocating the fabricated composite nano-particles with the printed text or images.

The method also includes detecting luminescent nano particles and/or magnetic nano particles; and determining invariant properties of the detected nano particles. The invariant properties are then matched with coded information. In addition, the method includes matching the invariant properties with predetermined coded information and analyzing the invariant properties of the detected nano particles for segmentation. If there is segmentation the method searches previous records for similar text and provides the user with decoded information.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 is a diagram of the system according to an embodiment of the teachings herein;

FIG. 2A is a diagram of a system implementing luminescent signatures according to an embodiment of the teachings herein;

FIG. 2B is a diagram of a system implementing magnetic signatures according to an embodiment of the teachings herein;

FIG. 2C is a diagram of a system implementing radio frequency signatures according to an embodiment of the teachings herein;

FIG. 3 is a diagram of a nano-encoded text or image identification system according to an embodiment of the teachings herein;

FIG. 4 is a diagram of a text or image nano-particle labeling system according to an embodiment of the teachings herein;

FIG. 5 is a flow chart of the method of the teachings herein;

FIG. 7 is an illustration of a time-decay system according to an embodiment of the teachings herein;

Figure 6:
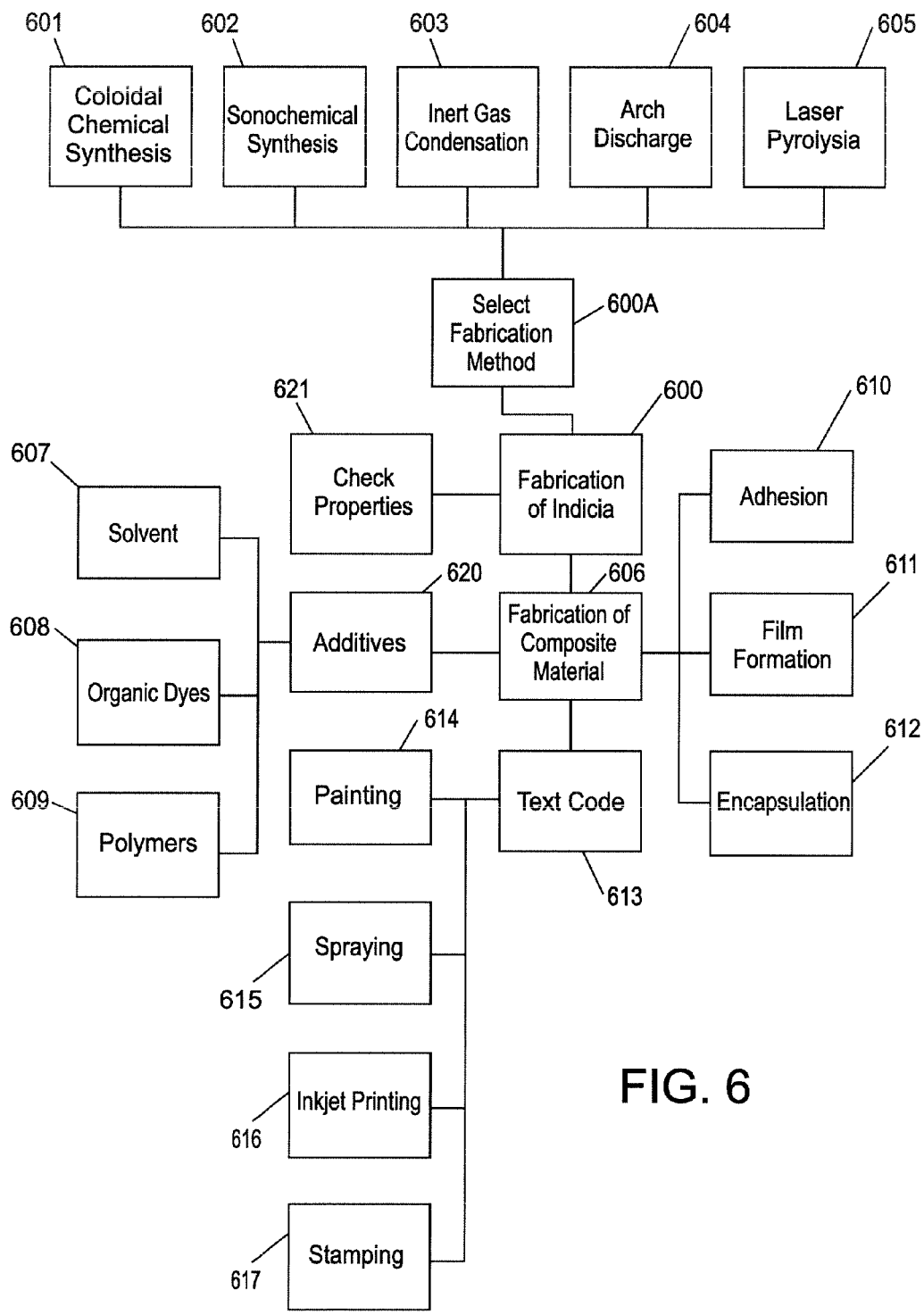
FIG. 6 is a diagram of a hierarchical index and segmentation verification system according to an embodiment of the teachings herein.

The detailed description explains the preferred embodiments of the invention, together with advantages and features, by way of example with reference to the drawings.

DETAILED DESCRIPTION OF THE INVENTION

According to an embodiment of the present invention, a molecular or nanometer scale mark can contain luminescent and/or magnetic markers. Examples of luminescent indicia include luminescent dye molecules, luminescent semiconductor indicia, phosphors, combinations of luminescent indicia, etc. Examples of magnetic indicia include materials exhibiting ferromagnetic resonance and the like.

It will be understood that luminescent particles emit light with a characteristic wavelength and life-time. Both these parameters depend on the particle size, shape and material associated with the luminescent particle. The emitted light is generated with an impinging light having a characteristic wavelength. It will be understood the emission wavelength, the spectral width, the emission life-time, the excitation wavelength, etc. can be digitized. Moreover, one can use a mixture of crystals to increase the number of digital bits.

Luminescent dye molecules (e.g., flourescein, quinine, perylene, rhodamine 6G, etc.) emitting in different spectral regions (e.g., blue, green, yellow, red, near-IR) and combinations thereof can be dissolved in an appropriate liquid (e.g., ethyl acetate) and put into a material such as a nail varnish. Detection of the luminescent dye molecules is based on excitation by light (e.g., ultra-violet (UV) light) and detection of specific dye luminescence. For example, rhodamine 6G molecules emit light at a wavelength of about 550 nm upon excitation by UV light with a wavelength of about 350 nm.

Luminescent semiconductor nanoparticles constitute a class of materials consisting of a small piece of a semiconducting material (e.g., Si, CdSe, CdTe InP, ZnSe, etc.) with a physical size between 1 nm and 15 nm capped with a shell of organic ligands. The band gap of semiconductor nanoparticles and, in turn, the emission wavelength depends on the particle size due to the quantum confinement effect [References: Talapin, D. V.; Rogach, A. L.; Kornowski, A.; Haase, M.; Weller, H.; *Nano Lett.;* 2001; 1(4); 207-211.; Talapin, D. V.; Gaponik, N.; Borchert, H.; Rogach, A. L.; Haase, M.; Weller, H.; *J. Phys. Chem. B.;* 2002; 106(49); 12659-12663.]; the disclosure of which is incorporated by reference in its entirety. Emission wavelength of semiconductor nanoparticles can be tuned through the entire visible spectral range and near-IR by varying particle size and chemical composition. The shell of organic ligands makes luminescent nanoparticles soluble in a desired solvent (e.g., polar solvents like water of non-polar solvents like hexane). Luminescent properties of semiconductor nanoparticles can be substantially improved if the emitting core of a nanoparticle is protected by the shell of a wide band-gap semiconductor (core-shell nanoparticles, e.g. CdSe/ZnS, CdSe/CdS, etc.) [Talapin, D. V.; Mekis, I.; Gotzinger, S.; Kornowski, A.; Benson, O.; Weller, H.; *J. Phys. Chem. B.;* 2004; 108(49); 18826-18831.]; the disclosure of which is incorporated by reference in its entirety.

The core-shell nanoparticles can be dispersed in an appropriate liquid carrier and used as luminescent marks analogous to the dye molecules. The advantages of semiconductor nanoparticles over dye molecules are: (i) higher stability, (ii) better purity of the emission color, (iii) possibility of simultaneous excitation of nanoparticles emitting in different spectral regions. Example: core/shell CdSe/ZnS nanoparticles capped with hexadecylamine-trioctylphosphine ligand shell can be dispersed in a non-polar solvent like hexane. The nanoparticle luminescence can be excited by a UV light source. Emission from nanoparticles depends on size of CdSe core (~3 nm—green, ~4.5 nm—yellow, ~6 nm—red).

Nanophosphores are colloidal nanoparticles doped with rare-earth elements (e.g., YVO4:Ln (Ln=Eu, Sm, Dy), LaPO4:Eu, LaPO4:Ce, LaPO4:Ce, Tb nanoparticles) [K. Riwotzki, H. Meyssamy, H. Schnablegger, A. Kornowski, M. Haase. Angew. Chem. Int. Ed. 40, 573 (2001)]; the disclosure of which is incorporated by reference in its entirety. These nanoparticles can be dispersed in an appropriate solvent like dye molecules or semiconductor nanoparticles. Luminescence of these nanoparticles is coming from electron transition between the characteristic f-levels of rare-earth doping atom. The advantage of this kind of luminescent nanoparticles over luminescent semiconductor nanoparticles are: (i) very characteristic emission spectrum consisting of several narrow lines at characteristic wavelengths; (ii) very high stability of luminescent properties. The luminescent properties of rare-earth doped nanoparticles can be further improved for growing core/shell nanoparticles (e.g., CePO4:Tb/LaPO4 Core-Shell Nanoparticles [Karsten Kömpe, Holger Borchert, Jörg Storz, Arun Lobo, Sorin Adam, Thomas Möller, Markus Haase. Angewandte Chemie International Edition Volume 42, Issue 44, 2003, Pages: 5513-5516]). Example: 5 nm LaPO4:Ce; the disclosure of which is incorporated by reference in its entirety. Tb nanoparticles stabilized by tris(ethylhexyl)phosphate can be dispersed in ethanol, methanol, 2-propanol or ethyl acetate. Luminescence of LaPO4:Ce,Tb nanoparticles can be excited at 275 nm. The emission spectrum consists of a series of characteristic lines with the most intense line at 542 nm. The lanthanide-doped NaYF4 nanocrystals [S. Heer, K. Kömpe, H.-U. Güdel, M. Haase Advanced Materials Volume 16, Issue 23-24, 2004, Pages: 2102-2105]; the disclosure of which is incorporated by reference in its entirety, can be used in luminescent security marks based on photon up-conversion principle: generation of visible radiation by near-IR excitation.

It is based on sequential absorption of several (two) photons transferring energy to a single emitted photon. This effect is very rare in nature, providing very high level of security. Examples: ~10 nm NaYF4:20%Yb,2% Er nanoparticles being excited by invisible near-IR (10270 cm-1) light emit visible green and red light while NaYF4:20%Yb,2%Tm nanoparticles being excited by invisible near-IR (10270 cm-1) light emit blue light.

Magnetic indicia can be implemented as a magnetic material dispersed in a solvent and used as media for magnetic data recording. The detection of the magnetic indicia can be based on reading information magnetically written on the layer of magnetic material. [Shouheng Sun, C. B. Murray, Dieter Weller, Liesl Folks, and Andreas Moser. *Science* 17 Mar.

2000; 287: 1989-1992.]; the disclosure of which is incorporated by reference in its entirety The use of magnetic indicia allows achieving high density of data recording. Information can be written on the film of magnetic particles in a manner similar to magnetic tapes or credit cards. The particles can potentially provide very high writing density (up to 1 Tbite per square inch).

Magnetic indicia can be embodied as a material exhibiting ferromagnetic resonance. Ferromagnetic materials, e.g., Co, Fe, MnBi, $MgOFe_2O$ exhibit dynamical susceptibility, which is the magnetic response or the degree of magnetization of a material in response to a magnetic field. Resonance field and line width depend on effective anisotropy, relaxation time of the magnetization, and other parameters of the magnetic indicia used as security labels. Combination of indicia of different materials or indicia of the same material but of different size can generate a complex magnetic response for increasing metadata processing.

Extensions of magnetic marks are ferromagnetic marks. The information borne by a ferromagnetic mark is the characteristic resonant magnetic field. This parameter depends on the magnetic anisotropy constant of the material (e.g., depends on the material) and on the particle size and shape.

Quantum effects can be unique for different materials; the size quantization of electronic structure and magnetic properties of materials can be used as indicia.

According to the examples set forth herein, nano-particles can be used for text and image labeling.

Turning now to the drawings in greater detail, it will be seen that in FIG. 1 there is text (100) that is coated with nano-particles (100A) by nano-encoder (100B) and may be subsequently analyzed by the detection system (101) which sends the information to the network (102). It will be appreciated that the nano-encoder (100B) and the nano-detection system (101) may be any suitable nano encoder/decoder, such as, for example, nano luminescent particles or nano particles having exploitable magnetic properties.

Data from the network (102) is sent to the text processing database (103) where the encoded information from the nano-particles (100A) is processed into data compatible with the user output device (104) which provides the user with a summary (105), translation (106), or a definition (107) of the text (100).

FIG. 2A shows the process of detecting luminescent nano-particles. A light source (201) provides a pulsed excitation light, and the light detector (202) measures the luminescence life-time characteristic of the nano-particle (100A) embedded in the text (100).

FIG. 2B shows a detector having a magnetic read head (203) which magnetically processes the information written to a layer of nano-particles (100A) specific to the text (100).

FIG. 2C shows a user scanning device (206) which measures the power of radio-frequency radiation absorbed by nano-particles (100A) in text (100). Radio-frequency radiation is generated by the generator (204) and a magnetic field is produced by another generator (205). Under characteristic magnetic fields magnetic particles show strong absorption of radio-frequency radiation.

FIG. 3 describes in detail the detection system (101). The transformer (300) converts sensor data into a coded array which is sent to a matcher (301) of the coded array which matches the array to the appropriate text processing functions. For example, the word "Boat" should be matched to its appropriate definition, or translation into another language. The confidence checker (302) determines a level of matching between the decoded array data and the chosen text processes. In order to prevent incorrect translations, definitions, or summaries, the text must properly match its text processing functions.

FIG. 4 describes the functions of the text processing database (103). Once the confidence checker (302) confirms an appropriate level of matching between the coded array data and the appropriate text functioning processes, data is sent to the hierarchical index organizer (405). This system will be outlined in FIG. 7. Information from the organizer is sent to the definition database (401), the translation database (400) and the summary database (402). Each database provides the appropriate information that will be sent to the compiler (404). The translation database contains a user language module (400A) which allows the translation database (400) to translate the selected text (100) into the user's selected language.

FIG. 5 describes the user output device (104), which is where the processed text information is presented to the user. The compiler (404) sends the appropriate data to the users output device a pen (500) which contains the original detection system (101) or a display (501) which may be glasses, a watch, or any other type of suitable display. The pen (500) contains an audio formatting module (500A) which converts the translated, defined, or summarized text into audio. The user display (501) contains a pronunciation index (501A) which provides the user with a key on how to pronounce the translated, defined, or summarized text (105, 106, 107).

FIG. 6 refers to a method for creating unique identification properties of nano-particles that will be embedded in text. Fabricating indicia (600) with unique luminescent or magnetic signatures can be formed by colloidal chemical synthesis (601), sonochemical synthesis (602), inert gas condensation (603), arc discharge (604), or laser pyrolysis (605). A composite material with the desired luminescent or magnetic signature is prepared by mixing different nanoparticles (606). Additives such as solvents (607), organic dyes (608) and polymers (609) can be added (620) to the composite material to provide desired physical and chemical properties (621) such as adhesion (61), film formation (611), encapsulation (612), to the text or image. The encoded nano-particles can be placed on a desired surface using different techniques such as painting (614), spraying (615), inkjet printing (616), and stamping (617).

FIG. 7 describes the hierarchical index organizer. It is necessary to distinguish between word, phrases, and paragraphs that the user might select. This is done by the hierarchical index organizer (700). Within the organizer there is a phrase identifier (701), a word identifier (702), and a paragraph identifier (703). The identifiers recognize the appropriate format of the text selected by a user (a word, phrase, or paragraph) and send the data to a compiler (704) which organizes the selected data by words, then phrases, and then paragraphs. This information is then sent to the segmentation verifier (705) which ensures that the selected text was properly selected by the user. For example, the user might wish to select the word "colder" from a given text. However, if they improperly use the selection tool they might only select "cold" producing an incorrect translation, definition, or summary. The segmentation verifier (705) then sends data to the user output device (104).

Figure 8:
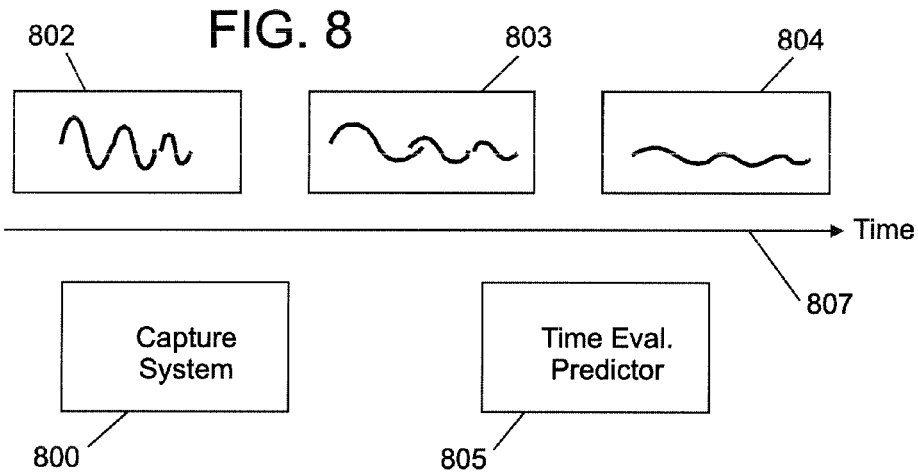
FIG. 8 is a flow chart of the text processing functions of the teachings herein.

Referring to FIG. 8 and the evolution of signatures with time; the capture system 800 accepts signature related information from sensors in 101. Signature shots at different times 801 are shown in 802, 803, and 804. These signature shots are compared with known evolution properties for signature prototypes to assist in matching with relevant text processes.

Figure 9:
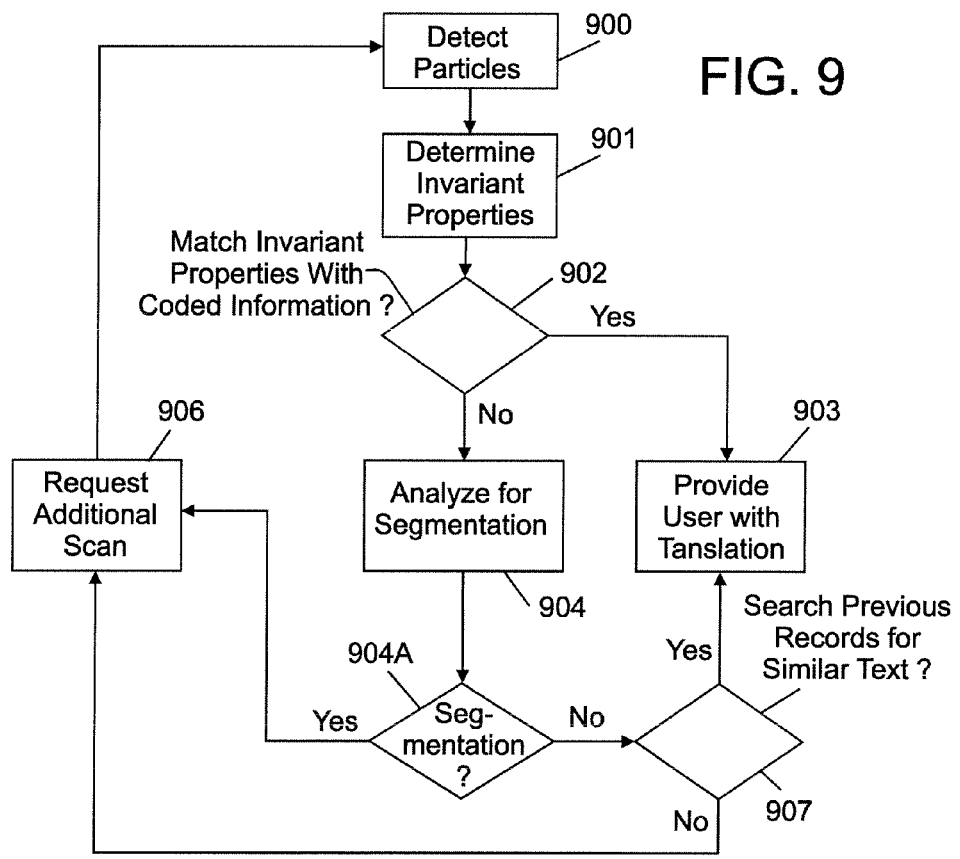
FIG. 9 is a diagram of a system that can be used to implement features of the teachings herein.

FIG. 9 is a flow chart of the method for one embodiment of the present invention. Particles are detected 900 using any suitable scanning device such as, for example, a magnetic scanner or an optical scanner. Invariant properties (like composition of materials, time dependant characteristics, etc.) of the particles are determined 901. The invariant properties are matched 902 with stored coded information. If there is a successful match the user is provided 903 with translation, definition, or summary of the selected text. If there is no match the selected data is analyzed 904 for segmentation. If segmentation exists, 904A, the user is prompted to scan again 906. If segmentation does not exist 904A a search is conducted 907 of previous scans with similar coded information which is then used to provide the user with the necessary information. If the search is inconclusive, 908, an additional scan is requested.

Electronic form of ink that can be manipulated and scanned to obtain additional information. Electronic ink can be encoded while a book or text document is created or after its creation as a template put over the text.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. For example, nano-particles can be encoded into the text of a given paper that represents different language translations. Every printed word in a given text document can encode for different translations. Another example includes encoding nano-particles to code for information for different clusters like phrases, paragraphs. Other text processing related information like summaries simplification, references, and other kinds of metadata can be encoded into text using nano-particles, in addition to translation codes. Another example incorporates audio into nano-particle coded images and text.

These claims should be construed to maintain the proper protection for the invention first described.

What is claimed is:

1. A method for nano-encoding information related to printed texts or images on paper and other surfaces, the method comprising:

fabricating composite material by mixing nano-particles, the composite material comprising a signature;

collocating the fabricated composite nano-particles with the printed text or images; and nano-decoding the information, wherein nano-decoding the information comprises:

detecting nano particles;

determining invariant properties of the detected nano particles;

matching invariant properties with predetermined coded information;

analyzing the invariant properties of the detected nano particles for segmentation, in response to detecting that there is no match, and redetecting the nano particles in response to determining that the nano particles exhibit segmentation; and providing user with decoded information.

2. The method as in claim 1 wherein detecting nano particles comprises detecting luminescent nano particles.

3. The method as in claim 1 wherein detecting nano particles comprises detecting magnetic nano particles and luminescent nano particles.

4. The method as in claim 1 wherein detecting nano particles comprises detecting magnetic nano particles.

5. The method as in claim 1 wherein analyzing the invariant properties of the detected nano particles for segmentation further comprises searching previous records for similar text.

6. A non-transitory storage device readable by a machine, storing instructions executable by the machine to perform a method for nano-encoding information related to printed texts or images on paper and other surfaces, the method comprising;

fabricating composite material by mixing nano-particles, the composite material comprising a signature; and collocating the fabricated composite material with the printed text or images; and detecting nano particles, wherein detecting nano particles comprises:

detecting luminescent nano particles, or detecting magnetic nano particles;

determining invariant properties of the detected nano particles; and matching the invariant properties with predetermined coded information, wherein matching invariant properties with coded information comprises:

analyzing the invariant properties of the detected nano particles for segmentation in response to detecting that there is no match, and redetecting the nano particles in response to determining that the nano particles exhibit segmentation;

searching previous records for similar text; and providing user with encoded information.

7. The non-transitory storage device as in claim 6, tangibly embodying a program of instructions executable by the machine to perform the method for nano-encoding information related to printed texts or images on paper and other surfaces further comprising:

detecting luminescent nano particles, and detecting magnetic nano particles.

* * * * *